United States Patent
Woerndle et al.

(10) Patent No.: US 9,344,360 B2
(45) Date of Patent: May 17, 2016

(54) TECHNIQUE FOR MANAGING AN ALLOCATION OF A VLAN

(75) Inventors: Peter Woerndle, Wangen im Allgau (DE); Daniel Catrein, Wurselen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 161 days.

(21) Appl. No.: 14/002,238

(22) PCT Filed: Mar. 3, 2011

(86) PCT No.: PCT/EP2011/053170
§ 371 (c)(1),
(2), (4) Date: Aug. 29, 2013

(87) PCT Pub. No.: WO2012/116749
PCT Pub. Date: Sep. 7, 2012

(65) Prior Publication Data
US 2013/0336331 A1    Dec. 19, 2013

(51) Int. Cl.
*H04L 12/713* (2013.01)
*H04L 12/46* (2006.01)
*H04L 12/715* (2013.01)
*H04L 12/721* (2013.01)
*H04L 12/723* (2013.01)

(52) U.S. Cl.
CPC .......... *H04L 45/586* (2013.01); *H04L 12/4641* (2013.01); *H04L 45/04* (2013.01); *H04L 45/38* (2013.01); *H04L 45/50* (2013.01)

(58) Field of Classification Search
CPC ..................................................... H04L 45/586
USPC ....................................................... 370/315
See application file for complete search history.

(56) References Cited

U.S. PATENT DOCUMENTS

| | | | |
|---|---|---|---|
| 7,113,512 B1* | 9/2006 | Holmgren et al. | 370/395.53 |
| 7,606,939 B1 | 10/2009 | Finn | |
| 7,769,006 B1 | 8/2010 | Chase et al. | |
| 8,644,188 B1* | 2/2014 | Brandwine et al. | 370/254 |
| 2003/0142685 A1* | 7/2003 | Bare | 370/410 |
| 2003/0152075 A1 | 8/2003 | Hawthorne, III et al. | |
| 2004/0095941 A1 | 5/2004 | Natsume et al. | |
| 2004/0202171 A1 | 10/2004 | Hama | |
| 2005/0174943 A1* | 8/2005 | Wang | H04L 12/4645 370/235 |
| 2006/0007939 A1* | 1/2006 | Elangovan | H04L 12/465 370/395.53 |

(Continued)

FOREIGN PATENT DOCUMENTS

EP    2 019 514 A1    1/2009

*Primary Examiner* — Gerald Smarth
(74) *Attorney, Agent, or Firm* — Rothwell, Figg, Ernst & Manbeck, P.C.

(57) ABSTRACT

Techniques for allocation of a VLAN for a deployment by at least one VM provided on a host in a network. A VLAN manager is adapted to allocate a free physical VLAN identifier to the requested virtual VLAN identifier. The VLAN manager queries a VLAN mapping table for determining a free physical VLAN identifier. In case the physical VLAN identifier for the requested virtual VLAN identifier is in use, a procedure for determining the at least one free physical VLAN is performed. The determination procedure may be based on pre-defined zoning or it may apply a retagging after a free physical VLAN identifier has been calculated. The determined physical VLAN identifier is assigned to the requested VLAN. The VLAN switch devices are instructed about the assignment between the virtual and the physical VLAN identifier in order to apply the assignment of the data packets transported over the requested VLAN.

15 Claims, 4 Drawing Sheets

(56) References Cited

U.S. PATENT DOCUMENTS

2007/0274321 A1  11/2007  Jonsson et al.
2008/0031266 A1   2/2008  Tallet et al.
2010/0189117 A1*  7/2010  Gowda et al. ................. 370/401
2010/0290398 A1* 11/2010  Choudhary et al. .......... 370/328

* cited by examiner

TECHNIQUE FOR MANAGING AN ALLOCATION OF A VLAN

CROSS REFERENCE TO RELATED APPLICATION(S)

This application is a 35 U.S.C. §371 National Phase Entry Application from PCT/EP2011/053170, filed Mar. 3, 2011, designating the United States, the disclosure of which is incorporated herein in its entirety by reference.

TECHNICAL FIELD

The present disclosure generally relates to the field of managing an allocation of a VLAN for a deployment by one or more virtual machine VM. In particular, a technique is presented which may be used in a cloud computing or in a data center.

BACKGROUND

Virtual LAN (VLAN) is a technology to subdivide a single physical network connection into multiple independent logical connections. In a VLAN the computers behave as if they are connected to the same wire even though they may actually be physically located on different segments of the physical LAN. VLANs are widely used in packet based telecom networks, for example to separate signaling and media traffic or to separate Operation and Maintenance O&M traffic from payload traffic.

Each VLAN builds, like in case of a usual physical separated network subsystem, its own broadcast domain created by switches. In the VLAN the data packets are switched according to the in the data packets header included tags identifying the assignment of the data packets to a particular VLAN and according to the assignment of the tags to the I/O ports in the switches. After the data packets are transmitted on their respective VLANs through the corporate network, the VLAN tag may be stripped before the data packet is sent.

The method describing the sharing of a physical Ethernet network link by multiple independent logical networks by using the tags is standardized in IEEE 802.1Q, or VLAN Tagging. In IEEE 802.1Q, each Ethernet packet is tagged with a VLAN tag in the 802.1Q header of the data packet to identify uniquely a VLAN for purpose of routing. The 802.1Q header reserves 12 bits for a VLAN tag allowing an allocation of 4094 different VLANs (some values are reserved).

Cloud computing and virtualization are current trends in the field of information technology that are also gaining momentum in neighboring fields such as telecommunication. A primary advantage of cloud computing is the fact that it can almost instantly provide unlimited computing, storage, or networking resources. Cloud computing is Internet-based computing, whereby shared resources, software, and information are provided to computers and other devices on demand.

Large public cloud providers, such as Amazon, can provide hundreds or thousands of computers in a matter of minutes to any user in need of cloud computing resources. Computing clouds may also be private, for example, to a company. In a private cloud scenario, the cloud is operated and used by the same company, and virtual resources are only made available inside the company. By their nature, private clouds have a limited capacity and are therefore often combined with public clouds to create so-called hybrid clouds so as to jointly utilize public and private cloud resources.

Today, different computing clouds typically rely on different technologies. That is, there are little established standards regarding, for example, Application Programming Interfaces (APIs), virtualization platforms (so-called hypervisors) or resource description formats (e.g., for Virtual Machines, VMs). Hereby, the platform virtualization is a virtualization of computers or operating systems. It hides the physical characteristics of a computing platform from users, instead showing another abstract computing platform. The software that controls the virtualization is called a hypervisor or virtual machine monitor.

Also, the environments offered by the clouds (e.g., with respect to networking) may differ from cloud provider to cloud provider. Major providers that offer public or private clouds are VMware with their own hypervisor, the vCloud and vSphere APIs and a proprietary format for virtual machines, Amazon with Xen as hypervisor, the EC2 and S3 APIs and their own proprietary AMI format for virtual machines, or Eucalypthus with KVM or Xen as hypervisor, the EC2 and S3 API and the proprietary EMI virtual machine format, to name only three providers.

Hypervisors used in today's Clouds include further the functionality of virtual switches. Multiple virtual machines running on the same hypervisor can be inter-connected or connected to external networks via virtual switches. Even though, most of these hypervisors support VLANs, most Clouds do currently not expose VLAN support, particularly for IEEE 802.1Q VLANs. If there is VLAN support, it is limited to manual management of VLANs, i.e., VLANs need to be assigned manually to different ports on the virtual machines and hypervisors.

However, a key principle of Cloud Computing is to abstract resources and to provide them to users in a self service manner. Additionally the usage of a cloud environment should be transparent to the user, which means that the user should be able to setup an application like using an independent physical environment.

Applying VLAN to the Cloud Computing faces however different problems. In particular, the requirements of Cloud Computing are that a user may request a VLAN with particular properties, wherein the properties may be for example a specific VLAN tag or specific network level QoS parameters. However, VLAN tags need to be unique if requesting a new VLAN in order to route the data packets properly. Thus, in case of implementing VLAN into Cloud Computing it will not be possible to allow users to request their own tags. With only 4094 different tags, there is a high probability that the same tag will be used by two different users.

There are standards like e.g., from IEEE that allow "stacked" VLAN tags, e.g., IEEE 802.11 QinQ. This standard adds another VLAN tag into the IEEE 802.1Q pack-age. This results in 4094*4094 available VLANs. However, this standard does solve the previously described problem only for some applications, namely for those being already implemented for using these kind of data packets. Furthermore, the disadvantage of this standard is that it is not transparent to services running on the virtual machines in the network. The additional VLAN tag increases the size of the Ethernet packet by 4 bytes limiting the number of bytes available to applications. Thus, every virtual machine and every service in these machines needs to be aware of the limited Maximum Transport Unit (MTU) size.

SUMMARY

There is a demand for a technique for an efficient managing allocation of a VLAN for a deployment by at least one VM provided on a host in a network.

The invention is embodied in independent claims. Advantageous embodiments are described in the dependent claims.

The demand is satisfied with managing an allocation of a VLAN for a deployment between a first virtual machine VM and a second virtual machine VM for transferring data packets wherein a VM is attached to a host, the method comprising the step of receiving a request for allocating a VLAN. It is to be noted that there might be a several VM attached to a number of hosts. Further a VM may be deployed by several VLAN. In the next step a free VLAN is identified by checking an assignment of a virtual VLAN identifier of the requested VLAN to a physical VLAN identifier wherein the physical VLAN identifier is to be used uniquely by a VLAN switch device for switching data packets of the requested VLAN. Further it is proposed that in case the physical VLAN identifier is in use a procedure for determining the at least one free physical VLAN is performed. Further it is proposed that the virtual VLAN identifier of the requested VLAN is assigned to the at least one free physical VLAN identifier. Finally at least one VLAN switch device is instructed about the assignment between the virtual and the physical VLAN identifier in order to apply the received assignment between the virtual VLAN identifier of the requested VLAN and the free physical VLAN identifier to the data packets being transported over the requested VLAN.

According to one aspect, a method for managing an allocation of a VLAN for deployment between a first virtual machine VM and a second virtual machine VM for transferring data packets wherein a VM is attached to a host. Said method comprises the steps of sending a request towards a VLAN manager for allocating a VLAN for the deployment of at least one VM. In the following step an assignment of a virtual VLAN identifier of the requested VLAN to at least one free physical VLAN identifier is received, wherein the physical VLAN identifier is to be used uniquely by a VLAN switch device for switching data packets of the requested VLAN and in case the physical VLAN identifier is in use, a physical VLAN identifier is determined by means of a determination procedure. The switch device applies the received assignment between the virtual VLAN identifier of the requested VLAN to the physical VLAN identifier to the data packets being transported by the VLAN switch device for the requested VLAN.

The abovementioned demand is also satisfied by a VLAN manager device adapted to manage an allocation of a VLAN for deployment between a first virtual machine VM and a second virtual machine VM for transferring data packets wherein a VM is attached to a host. Said device comprises a receiver adapted to receive a request for allocating a VLAN. Further the VLAN manager comprises a determination unit which is adapted to identify a free VLAN by checking an assignment of a virtual VLAN identifier of the requested VLAN to a physical VLAN identifier wherein the physical VLAN identifier is to be used uniquely by a VLAN switch device for switching data packets of the requested VLAN. In case the physical VLAN identifier is in use, the determination unit is adapted to perform a procedure for determining at least one free physical VLAN identifier. An assignment unit is foreseen to assign the requested virtual VLAN identifier to the at least one free VLAN physical identifier for the VLAN and a sender is adapted to instruct at least one VLAN switch device to apply the assignment between the virtual and the physical VLAN identifier to the data packets transferred by the VLAN switch device for the requested VLAN.

In a further embodiment a VLAN switch device is proposed which is adapted to allocate a VLAN for a deployment between a first virtual machine VM and a second virtual machine VM for transferring data packets wherein a VM is attached to a host. Further a receiver is proposed which is adapted to receive an instruction regarding an assignment of a virtual VLAN identifier of the requested VLAN to a free physical VLAN identifier, wherein the physical VLAN identifier is to be used uniquely by a VLAN switch device for switching data packets of the requested VLAN and in case the physical VLAN identifier is in use, a physical VLAN identifier is determined by means of a determination procedure. An implementation unit in the VLAN switch device is adapted to apply the assignment to the data packets being transported over the requested VLAN.

The abovementioned demand is also satisfied by a method adapted to manage an allocation of a VLAN for deployment between a first virtual machine VM and a second virtual machine VM for transferring data packets wherein a VM is attached to a host, the method comprises the steps of transporting a request for allocating a VLAN for the deployment between a first and a second VM to a VLAN manager device. In the next step a free VLAN is identified by checking an assignment of a virtual VLAN identifier of the requested VLAN to a physical VLAN identifier wherein the physical VLAN identifier is to be used uniquely by a VLAN switch device for switching data packets of the requested VLAN and in case the physical VLAN identifier is in use a procedure for determining at least one free physical VLAN identifier is performed. In the next step the requested virtual VLAN identifier is assigned to the determined at least one free VLAN physical identifier for the requested VLAN and a VLAN switch device is instructed to apply the assignment between the virtual and the physical VLAN identifier to the data packets transferred by the VLAN switch device for the requested VLAN. Further it is proposed that the VLAN switch device applies the assignment between the virtual VLAN identifier of the requested VLAN to the physical VLAN identifier of the data packets being transported over the VLAN.

The system allows transparent VLAN management for users and for client applications. Thus, a user sees only the originally used virtual VLAN identifiers, even though different physical VLAN identifiers are used while transporting data packets in the network at the physical layer. Further the invention allows assigning more than the 4096 physical VLAN identifiers by re-assigning the same virtual VLAN tag to different users or applications.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled artisan will appreciate that the current invention may be practiced with any wireless network like for example UMTS, GSM or LTE networks. As another example, the invention may also be implemented in wireline networks, for example in any IP-based networks. Further the invention is applicable for implementing in any data center deploying usage of VMs. In particular the invention may be applied to management of a cloud computing network.

It is to be noted that the segmented data on layer 2 of the OSI model are called data frames. In the present application the term data packets are used without assigning the data segments to any protocol layer.

The VLAN identifier may be realized in any suitable and preferable way. The identifier may be constituted by a VLAN tag as standardized and being included in the header of the data packets transported over a VLAN. However, the identifier may be provided in any suitable and preferably way.

Furthermore the physical VLAN identifier is used on the physical layer for transporting data packets. The virtual VLAN identifier is used on the virtual layer for identifying a VLAN. The virtual VLAN identifier is an abstract address and therefore it is not required that the virtual VLAN identifiers are unique. Thus, a particular VLAN with a particular security level is identified by a particular virtual VLAN address and the VMs requesting the allocation of said VLAN may use the same virtual VLAN address. It is the task of the physical protocol layer to distinguish the data packets belonging to the different VLANs connecting different VMs.

In contrary to the virtual VLAN identifier, the physical VLAN identifier is to be uniquely used by a VLAN switch device. Thus, a VLAN switch device switching data packets of the requested VLAN uses a unique physical VLAN identifier in order to distinguish data packets belonging to different VLANs an being sent to the attached link. It is necessary to distinguish the different data flows in order to avoid an occurrence of a conflict. An occurrence of a conflict means that a VLAN switch device uses the same physical VLAN identifier to route data packets belonging to different VLANs, so that upon reception of the data packets on the virtual layer, the separation of the data to the different virtual LAN would be impossible.

Therefore it is the task of the VLAN manager to provide a unique physical VLAN identifier to the VLAN switch devices. Thus the VLAN manager has the task to determine the physical VLAN identifier which is to be used by a particular VLAN switch device.

Further, the term VLAN switch device should apply to any nodes being adapted to provide a switching of data packets belonging to a VLAN. In particular the VLAN switch devices are provided on the physical layer and are responsible for using a physical VLAN identifier to switch data packets. The functionality of the VLAN switch device may be performed by a host, a hypervisor or a switch connecting hosts.

In general, the invention proposes a VLAN manager being adapted to allocate free physical VLAN identifier to a virtual VLAN identifier. The VLAN manager may query a VLAN mapping table for determining a free physical VLAN identifier. Further the VLAN manager may have knowledge of the network configuration; in particular the knowledge of the usage of VLAN by VMs. In case the physical VLAN identifier for the requested virtual VLAN identifier is in use a procedure for determining the at least one free physical VLAN identifier is performed. Said determination procedure may be based on pre-defined zoning or it may apply a retagging after a free physical VLAN identifier has been calculated. In the next step the determined physical VLAN identifier is assigned to the requested VLAN. Finally the VLAN switch devices are instructed about the assignment between the virtual and the physical VLAN identifier in order to apply said assignment to the data packets being transported over the requested VLAN. The applying may be realized by performing a retagging of the incoming and outgoing data packets between the physical and the virtual VLAN identifiers in a VLAN switch device.

Figure 1:
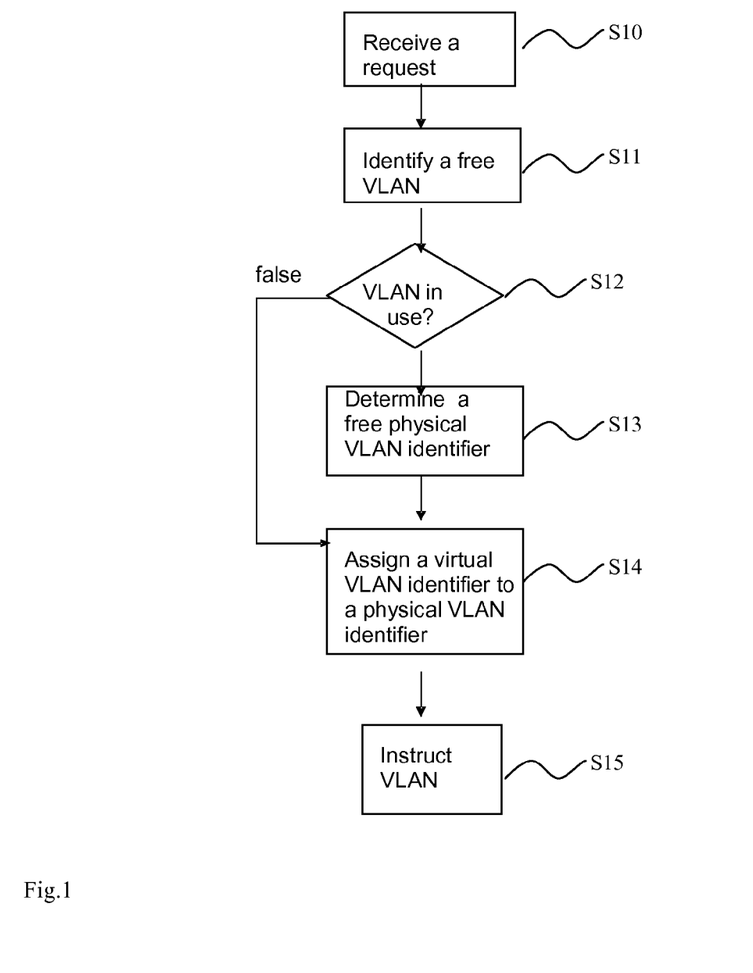
FIG. 1 is a flow diagram exemplarily illustrating an operation of the embodiment of the invention performed in the VLAN manager.

In the following an embodiment of the present invention is presented in respect to FIG. 1 showing a flow chart with steps according to the present invention. Preferably the steps according to FIG. 1 are performed at the VLAN manager device. Said device might be realized as a new functional entity or it may be implemented on a dedicated node or as a part of a Operation and Maintenance (O&M) system or even as a part of a hypervisor.

In the first step, S10, a request for allocating a VLAN for the deployment by the at least one VM is received.

The request may comprise a number of VLANs which are to be deployed by the VMs. A VM may request different VLANs for different purposes. For example, it may request a VLAN with a higher security protection and a VLAN for transporting general information or VLANs with different security levels. Thus, the request may comprise properties being requested by a user, like for example a specific VLAN tag or specific network level QoS parameters. In one embodiment it is proposed that the VLAN Manager offers a request API via which users and/or applications may request new VLANs and can configure which of their virtual machines shall be connected to this VLANs. The request may be received either directly form a user or from a VLAN switch device like for example from a host or a switch, or from an operator or any entity requiring a deployment of VLAN.

In the next step, S11, a free physical VLAN identifier is identified by checking an assignment of a virtual VLAN identifier of the requested VLAN to the physical VLAN identifier. Preferably, the VLAN manager knows the topology of the network and the assignments of all VLANs to the virtual machines VM. In a preferred embodiment, the VLAN manger comprises further a database, in which the assigning of the virtual and the physical VLAN identifier is administrated. According to the information included in the database the VLAN manager checks the availability of a physical VLAN identifier by querying said database. It is to be said that the VLAN manager checks all links of the physical layer on the connection path between the first and the second VM in order to ensure that a VLAN switch device being involved in the transmission of the data packets uses a unique physical VLAN identifier. Thus, the VLAN manager may check the entries of the database, which is called in the following, VRT (VLAN Retagging Table) table. In case a new physical VLAN address is determined, an update of the corresponding entries in the database is performed. Finally preferably parts of a VLAN retagging table are provided to all involved VLAN switch devices, like for example switches and hypervisors.

In other words, the VLAN manager checks if the VLAN switch devices already use the physical VLAN identifier for routing data sent over the requested VLAN connection. The determination of the free physical VLAN address has the goal to avoid an occurrence of a conflict.

While querying the database either the physical or the virtual VLAN identifier may be used. Thus when an allocation for a VLAN is requested, the VLAN manger queries the database for checking if a physical VLAN identifier is already used by a VLAN switch device, step S12 either with the virtual or with the physical VLAN identifier of the requested VLAN.

In step S13 the procedure for determining the at least one free physical VLAN is carried out in case the requested VLAN is in use. In the frame of said procedure the VLAN manager determines which physical VLAN identifier might be reused. The VLAN manager has the task to determine free physical VLAN identifier in case two users request the same VLAN. Herein it is proposed to re-use the already assigned physical VLAN identifier. By reusing of the physical VLAN identifier, it is achieved to assign more than the 4096 VLAN tags. In the following two embodiments for realizing the determination procedure are presented, the zoning and the retagging. Herein it is to be mentioned that the VLAN manager may apply either one of the approaches, or a combination thereof.

According to one embodiment it is proposed to apply a zoning while determining a free physical VLAN identifier. According to this approach a zone is to be defined, whereby at least one switch with attached hosts builds a zone and between two zones particular VLAN is blocked by blocking the usage of a particular physical VLAN identifier between the two zones. Thus, zoning describes the splitting of switched networks at the granularity of the hosts attached to a switch, wherein a switch may be a member of several zones. Further it is proposed that a zone may comprise one or more switches. In other words, zoning means that on the interconnection link between switches specific VLANs are not defined, so that consequently data over the blocked VLANs between the zones may not be exchanged. According to this embodiment it is proposed that a free physical VLAN identifier is identified, wherein the identification appoints the usage of said free physical VLAN identifier within one zone by estimating that a VLAN switch device over which the data packets of the requested VLAN are to be transferred does not already use the same physical VLAN identifier for routing data packets.

Figure 2:
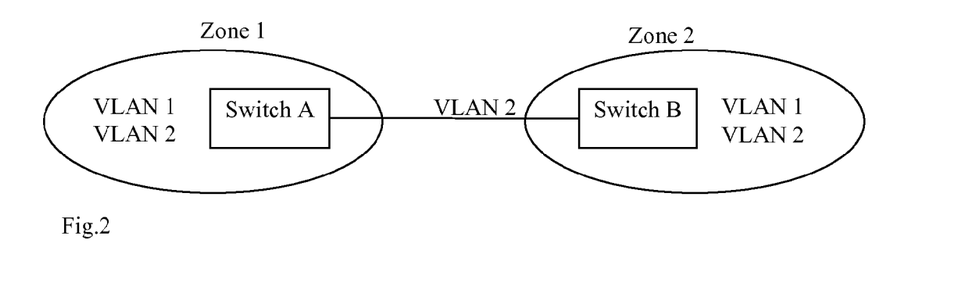
FIG. 2 schematically illustrates an embodiment of the present invention showing the zoning.

In the following the zoning approach is described according to FIG. 2. Herein two zones, zone 1 and zone 2 are depicted. Zone 1 comprises a switch A and switch B builds the zone 2. Although not in FIG. 2 shown, to the switches A and B, hosts deploying VLANs are attached. Switch A and switch B deploy the VLAN 1 and 2 and between the switch A and B an interconnection VLAN2 is shown.

According to FIG. 2 the zones are configured in a way, that only VLAN2 is enabled between zone 1 and zone 2 and VLAN1 is blocked between said zones. Consequently, hosts on switch A can use VLAN1 but can not communicate with hosts on switch B using VLAN 1 since between switches the interconnection VLAN 1 is not enabled.

The VLAN manager may configure the switches to form a zone, whereby the VLAN manager allows the deployment of the VMs within a zone with the constraint that the VMs may be deployed to a VLAN on hosts connected to switches of the zone. The configuration of the zones is therefore known to the VLAN manger so that in case a deployment of a VLAN 1 from the switch 1 is received, the manager assigns the VLAN 1 to a free physical VLAN identifier 1 knowing that the transmission of data over VLAN 1 remains in zone 1 and therefore also in zone 2 an assignment of the VLAN1 to the same physical VLAN identifier 1 is allowed. Thus, the requested virtual VLAN identifier is assigned to the identified free physical VLAN identifier (VLAN1) in both zones since the identification of the free physical VLAN identifier considers the usage of said free physical VLAN identifier within one zone and therefore the usage of the same physical VLAN identifier in the same zone is possible.

In contrary thereto, in case data exchange over VLAN2 is to be performed, the VLAN manger assigns for the requested VLAN2 two different physical VLAN identifiers in the presented two zones, zone 1 and zone 2.

Coming back to FIG. 1, in step S15 the VLAN switch devices are instructed about the assignment between the virtual and the physical VLAN identifier. According to the zoning embodiment, the VLAN switch device within the zone is instructed about the mapping between the virtual and the physical VLAN identifier.

In an other embodiment of the present invention for determining a free physical VLAN identifier if the requested VLAN by the VM network is already in use on the physical network, it is proposed to calculate a physical VLAN identifier and to apply the retagging approach. In particular the VLAN manager checks if the VLAN switch devices already use the physical VLAN identifier for routing data sent over the requested VLAN connection in order to avoid an occurrence of a conflict. Thus, in the frame of the determination procedure for determining the free physical VLAN identifier, the VLAN manager estimates that a VLAN switch device over which the data packets of the requested VLAN are to be transferred does not already use the same physical VLAN identifier for routing data packets.

In particular, the VLAN manager may at first takes a physical VLAN identifier and to check whether other VM on the same VLAN switch device already uses the physical VLAN address. In case of a conflict regarding the usage of the same physical VLAN identifier may occur, the VLAN manager determines to use another physical VLAN address, which is uniquely used by the VLAN switch device. Thus, the VLAN manager may decide that a particular VLAN switch device should use a physical VLAN identifier which is even though used by another VLAN switch device on the communication path between the first and the second VMs, however for the particular VLAN switch device it may be reused because said particular VLAN switch device does not use this physical VLAN identifier, thus no conflict will occur. The procedure for determining a free physical VLAN identifier is to be performed for all the VLAN switch devices on the communication path between the first and the second VMs.

The calculation might be done by checking the corresponding entries in the VLAN data base or by using optimization algorithms for large networks. The VLAN manager is expected to know the topology of the network as abovementioned. Finding a suitable assignment of the virtual VLAN identifier to the physical VLAN identifier can be seen as a graph coloring problem on a graph describing the topology of the network. Each node (e.g. virtual machine, switch) may be represented by a vertex in the graph. Thus, it is necessary to find a vertex coloring of the graph with 4094 colors, i.e., VLAN identifier. There are well known algorithms and heuristics to solve this approach.

In a further embodiment of the present invention for determining a free physical VLAN identifier, it is proposed to apply a combination of the retagging and the zoning approach. It is proposed that if the requested VLANs are already in use in the system the VLAN manager determines if there is a combination of zoning and retagging to enable the requested VLAN configuration. According to one aspect, it is proposed to apply the zoning and to use retagging within the zone. For example in case VMs attached to different hosts and the hosts located in the same zone request a deployment of the same VLAN, the VLAN manager may apply the retagging of the data packets within said zone.

Further it is to be noted that if determination procedure provides the result that there are no free VLANs and there is no way to fulfill the VLAN requirements of the VMs, it is proposed that the VLAN manager may not allow the deployment of the VMs. Additionally information about unused VLANs may be provided in a message to the user or operator.

Returning to FIG. 1, in the next step, S14, the virtual VLAN identifier of the requested VLAN is assigned to the determined at least one free physical VLAN identifier.

Preferably, the VLAN manager administrates the assigning of the virtual and the physical VLAN identifier in a database for storing the usage of the VLANs. It is proposed to add the assigned VLAN identifiers to the VLAN database in order to have the entries updated and to allow a proper management of the allocation a VLAN for the deployment of the VMs. In one embodiment it is proposed that the VLAN manager comprises a virtualization layer, which provides information on which hypervisors the VMs have been deployed. The knowledge of the deployment of the VLANs to the VMs is required for the VLAN manager to determine the free physical VLAN identifiers.

Finally, in step S15, the VLAN switch device is instructed to retag the incoming and outgoing data packets transported on the requested VLAN according to the assignment between the physical VLAN identifier and the virtual VLAN identifier. It is to be noted that a number of different VLAN switch devices might be instructed.

According to one aspect, it is proposed to send the instruction regarding the retagging of the incoming and outgoing data packets towards a switch. The switch may use the received instruction for switching data packets to/from the host being attached to the switch. Also in this case it is to be noted that if the VMs communicating over the same VLAN are deployed on different switches, then all the switches involved in the communication are to be informed.

According to other aspect, a host with a hypervisor as an embodiment of the VLAN switch device is instructed to use said instruction for retagging incoming and outgoing data packets transported on the requested VLAN between the VMs and a switch to which said host is attached. Herein it is to be noted that if the VMs communicating over the same VLAN are attached on different hosts, then all hosts and the corresponding hypervisors are to be informed.

Preferably the instruction may be provided by the VLAN manager as a table, for example as the VRT table containing information on how to exchange the VLAN identifiers of data packets transferred from/to the VMs. The exchange of the physical and virtual VLAN identifiers may be implemented in any suitable and preferably way. In one embodiment it is proposed to extend the mapping based on the physical and virtual VLAN identifiers with the MAC address of the VMs or some other unique identifier of the VM. The usage of a unique identifier of the VM is needed to provide the data packets to the right VM deployed on the right VLAN, since a number of VM may be attached to the same VLAN.

In a further embodiment it is proposed to receive a report message from the hypervisor regarding the deployment of the VLANs by the VMs. Thus, the hypervisor may send the unique VM identifier, like for example the MAC address of the VM assigned to the deployed VLAN. The VLAN manager may use this information while evaluating a free physical VLAN address. For example in case a new request from a VLAN switch device is received for the deployment of a virtual VLAN identifier, the VLAN manager may at first check whether an other VM on the same VLAN switch already uses the physical VLAN address. In case of a conflict regarding the usage of the same physical VLAN identifier may occur, the VLAN manager determines to use another physical VLAN address. On the other hand if the manager determines that a physical VLAN identifier is in use, but by a VM causing no conflict, it may determine to re-use the same physical VLAN address.

It is further proposed that upon reception of the report on which host which VM has been deployed, the VLAN manager determines the necessary configuration on the switches between the hosts. Additionally the VLAN manager may push a subset of the VLAN retagging table (VRT) to the reporting hypervisors in order to inform all the in the communication involved devices about the performed configuration in respect to the mapping of the VLAN identifiers.

As already mentioned the assignment of the virtual and the physical VLAN identifier is administrated in a database for storing the usage of the VLANs, like for example a VLAN mapping table. In one embodiment it is proposed to administrate the database in the VLAN manager as VLAN retagging table. Said table may be organized in any suitable and preferable way. In one embodiment it is proposed to structure the table in two layers. The first layer may be hosted on the VLAN manager and comprises information about the VLANs used in the system. In particular the first layer may comprise the mapping between the physical and the virtual VLAN identifier. The second layer may be located on the hypervisors and comprises a subset of the information from the first layer being relevant to the hypervisor and additionally information about the VLANs used by VMs in its premises. Preferably the first layer comprises the physical and the assigned virtual VLAN identifier and the MAC address of the VM being deployed on the VLAN.

In a further aspect of the invention it is proposed that the VLAN manager uses the information in the database to decide on a migration of a VM. Thus, when a VM which uses VLANs is migrated to another host either in standby mode or in running state, the VLAN manager may be informed about the migration action and may either determine a new configuration considering the usage of the VLAN identifiers or refuse to migrate the VM, for example in case a conflict regarding the usage of the VLAN identifiers may occur.

Furthermore, the VLAN manager may also be informed about deletion of VMs. If a complete set of VMs using VLANs is removed it is proposed that the VLAN manager deletes the entries from the database and mark the used VLANs as free.

Figure 3:
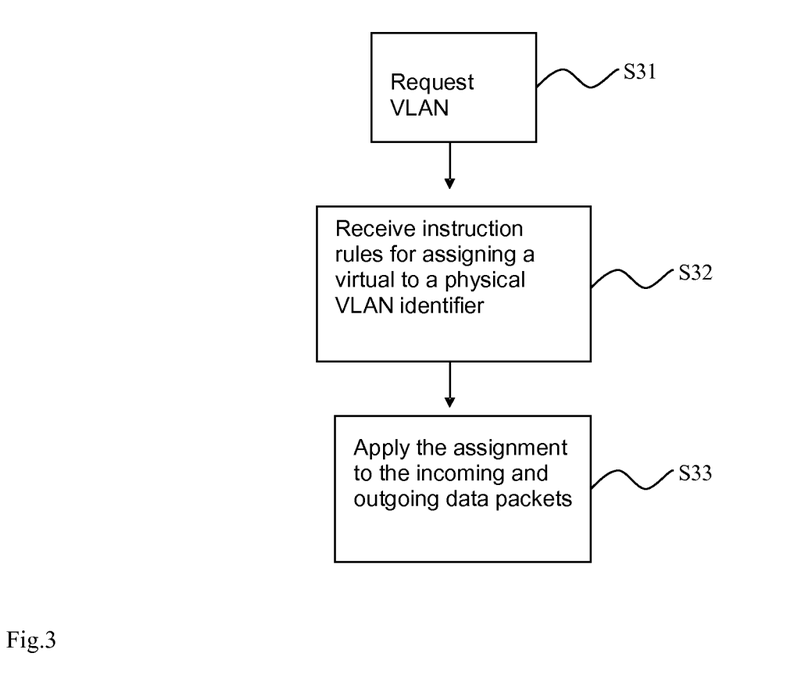
FIG. 3 is a flow diagram exemplarily illustrating an operation of the embodiment of the invention performed in the VLAN switch device.

According to another aspect, a method for managing an allocation of a VLAN for a deployment between a first and a second VM is proposed, wherein this method is to be carried out in a switch device. This embodiment is presented in the following in respect to FIG. 3 showing a flow chart with steps according to the present embodiment.

In step S31, a request is sent towards a VLAN manager for allocating a VLAN for the deployment by the at least one VM.

In the following step, S32, the assignment of a virtual VLAN identifier of the requested VLAN to at least one free physical VLAN identifier is received, wherein the free physical VLAN identifier is determined by means of a determination procedure in case the requested VLAN is in use. The determination is to be carried out as described in connection with FIG. 1.

The switch device applies the received assignment between the virtual VLAN identifier of the requested VLAN and the free physical VLAN identifier to the incoming and outgoing data packets being transported over the VLAN, S33. One embodiment regarding the applying of the assignment to the incoming and outgoing data packets comprises retagging of said data packets. As already mentioned the switch device may be for example a hypervisor or a switch. In the following, an embodiment for retagging in respect to the hypervisor is presented. However it should not be seen as a restriction, since the method can be applied to any switch devices being adapted to switch data packets being transported over a VLAN.

When the hypervisor receives an Ethernet packet tagged with a virtual VLAN identifier said hypervisor looks up the MAC address of the VM and the corresponding physical VLAN identifier in the VLAN retagging table (VRT). If there is an entry for the combination of MAC address and VLAN identifiers, the hypervisor replaces the virtual VLAN identifier with the physical VLAN identifier specified in the VRT. The packet with the new physical VLAN identifier is sent to the physical switch. The combination of the VLAN identifiers and the MAC address is to be seen as an embodiment, since the matching may be also done by applying directly the mapping between the virtual and the physical VLAN identifier.

Accordingly, when a hypervisor receives an Ethernet packet via a physical interface from the physical switch, it checks in the VRT the mapping between a physical and a virtual VLAN identifier and eventually in combination with the MAC address. If there is a hit, the physical VLAN identifier is replaced by virtual VLAN identifier and the data packet is forwarded to the VM by means of the MAC address.

It is to be appreciated that the VLAN switch devices are adapted in a way to make sure that packets are re-tagged to new physical VLAN identifier before forwarding them to the network. Furthermore, the physical VLAN identifier is changed back to the original virtual VLAN identifier before sending the data packets to a virtual machine. The mapping is made according to the assignment between the virtual and the physical VLAN identifier as determined in the VLAN manager. Thus, a user will only see the originally used virtual VLAN identifier even though different identifiers are used on the respective links in the network.

In a further aspect, it is proposed to add an unique VM identifier, like for example the MAC address of the VMs to the instruction regarding the mapping between the physical and virtual VLAN identifier. Preferably the MAC address is added to the VRT table. Said in the switch device updated table may be sent towards the VLAN manager.

Figure 4:
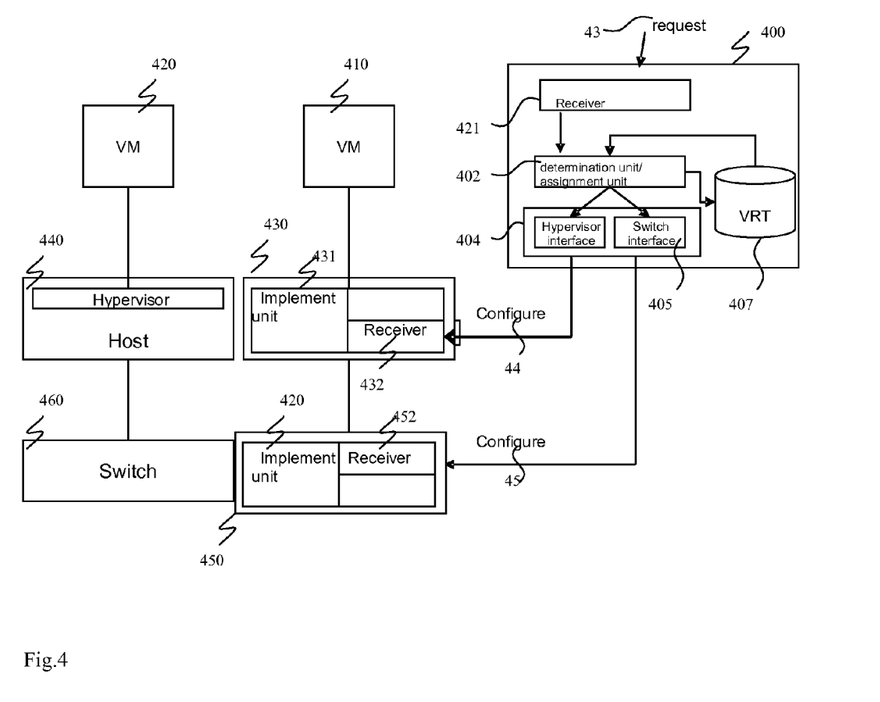
FIG. 4 schematically illustrates functional components of the system working according to an embodiment of the invention.

In an other aspect of the invention, a VLAN manager device is adapted to manage an allocation of a VLAN for a deployment between a first and a second VM is proposed. In the following the VLAN manager is presented in respect to FIG. 4. In FIG. 4 the VLAN manager, 400 is depicted. Said VLAN manager communicates with the switches 450, 460 and with the hosts, 430, 440, to which the virtual machines 410, 420 are attached.

In FIG. 4, the VLAN manager, 400 comprises a receiver, 401 adapted to receive a request, 41, 42, 43 for allocating a VLAN for the deployment by at least one VM, 410, 420. As already mentioned the request may be received either from a host (430, 440), 41 or from a switch (450, 460), 42 or from any other source requesting the deployment of the VLAN for particular VM, 43, like for example from an operator. Further the VLAN manager, 400 comprises a determination unit, 402 which is adapted to determine a free VLAN, wherein in case the requested VLAN is in use to perform a procedure for determining the at least one free physical VLAN, as described in connection with FIG. 1.

An assignment unit is foreseen to assign the requested virtual VLAN identifier to the at least one free VLAN physical identifier for the VLAN. The assignment unit may be provided in any suitable and preferably way. It may be part of the determination unit or it may be organized as a separate unit. Further the VLAN manager, 400 comprises a sender 404 being adapted to instruct, 44, 45, the VLAN switch devices, 430, 440, 450, 460 about the assignment between the virtual and the physical VLAN identifier. In the embodiment according to FIG. 4, the sender comprises further a hypervisor interface, 405 and a switch interface 405 being adapted to communicate with the switch or with the hypervisor respectively. Thus, the sender is to be implemented in any suitable and preferably providing the functionality of instructing the VLAN switch devices about the assignment. The instructing of the switch devices is performed by sending configuration instructions, 44, 45.

Further, the VLAN manager may comprise a database, 407 being adapted to administrate the assignment of a virtual VLAN identifier of the requested VLAN to at least one physical VLAN identifier, wherein the database 407 is arranged in a way to be able to communicate with the determination/assignment unit, in particular for checking whether a physical VLAN identifier is available. In case a physical VLAN identifier is in use, the determination unit determines a new assignment between the virtual and physical address, it is proposed to update the entries in said database.

In a further embodiment, a VLAN switch device is proposed which is adapted to allocate a VLAN for a deployment by at least one VM provided on a host in a network. The VLAN switch device is illustrated in FIG. 4. Said VLAN switch device may be arranged as a host 430, 440 or as a switch 450, 460.

A VLAN switch device, 430, 440, 450, 460 comprises a receiver, 432, 452 adapted to receive an instruction regarding an assignment of a virtual VLAN identifier of the requested VLAN to a free physical VLAN identifier, 44, 45, wherein the free physical VLAN identifier is determined by checking the availability of a physical VLAN identifier and by means of a determination procedure in case the requested VLAN is in use. Further the VLAN switch may comprise a sender adapted to send a request towards a VLAN manager for allocating a VLAN (not depicted in the FIG. 4). An implementation unit, 431, 451 in the VLAN switch device is adapted to apply the assignment to the incoming and outgoing data packets being transported over the VLAN. In particular, the implementation unit, 431, 451 applies the instruction for configuration of the incoming and outgoing data packets according to the determined assignment at the VLAN manager.

Figure 5:
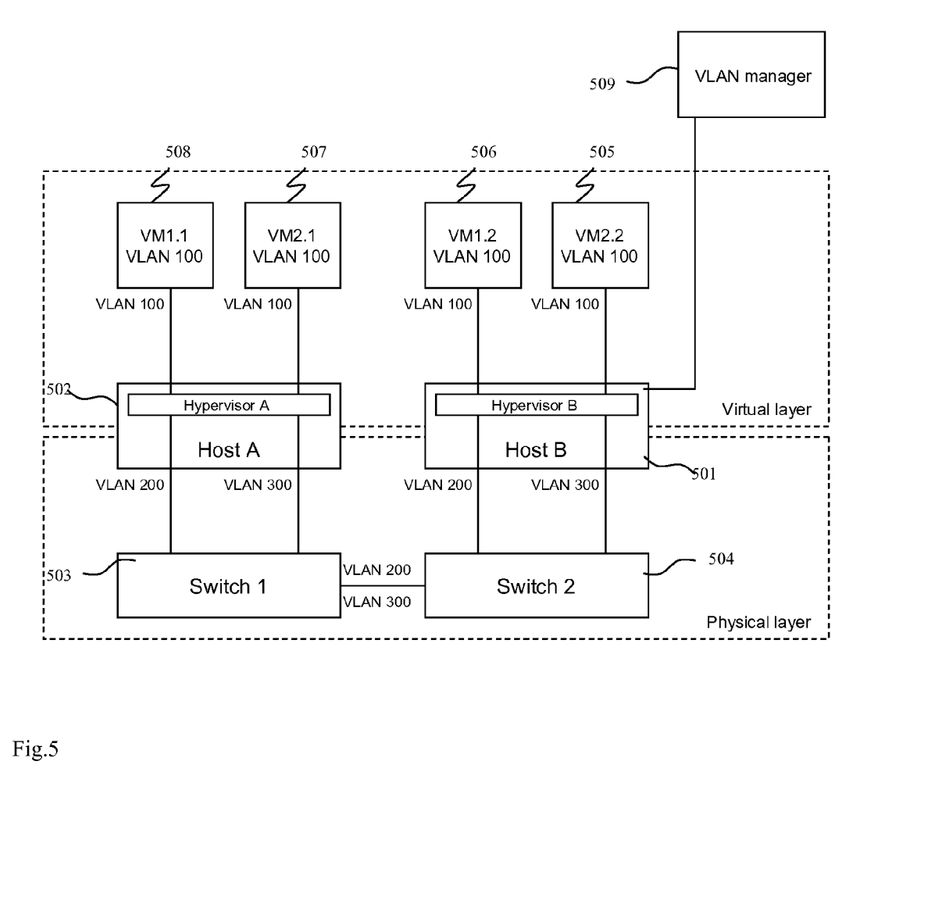
FIG. 5 schematically illustrates an embodiment of the invention.

In the following, a further embodiment of the present invention is presented in respect to FIG. 5. In FIG. 5 a host A, and host B, 501, 502 comprising respectively a hypervisor A and B are depicted. The hosts A and B communicate with the switch 1 and switch 2, 503, 504. Further there are VMs, 505-508 and a VLAN manager, 509. Furthermore a physical and a virtual layer are depicted in order to present the availability of a virtual and a physical VLAN identifier for the transferring of data respectively over a physical and a virtual layer.

Assuming, that the VM 1.2, 506 is to be deployed on the VLAN 100 for communication with the VM 1.1, 508. Herein the VLAN 100 corresponds to a virtual VLAN address. The hypervisor B, 501 forwards the received request to the VLAN manager, 509. Said VLAN manager checks whether the physical VLAN identifier VLAN 100 is in use, which means whether a physical VLAN address is already assigned to the virtual VLAN identifier VLAN 100. As a result of the determination, the VLAN manager, 509 assigns the physical VLAN identifier VLAN 200 to the virtual VLAN identifier VLAN 100 and instructs hypervisors A and B to configure the data packets being transported between VM 1.2, 506 and VM 1.1, 508 by replacing the virtual VLAN identifier VLAN 100 by the physical VLAN identifier VLAN 200. Consequently, the host B maps the data packets coming from the VM 1.2, 506 to the physical VLAN identifier VLAN 200 and forwards these data packets towards the switch 2 501, which routes the data packets towards the switch 1, 503 using the physical VLAN address VLAN 200. In the next step, the switch 1, 503 sends the data packets towards the host A, 502 using still the physical VLAN identifier, VLAN 200. The host A, 502 upon the reception of the data packets from the physical switch 1, 503, replaces the physical VLAN identifier VLAN 200 with the virtual VLAN identifier VLAN 100 and forwards said data packets towards the VM 1.1, 508.

Assuming that also the VM 2.2, 505 applies for the usage of the VLAN 100 by sending a request over the hypervisor B, 501 to the VLAN manager 509. Upon reception of the request for the deployment of the virtual VLAN identifier VLAN 100 from the VM 2.2, 505 the VLAN manager 509 checks the assignment for this virtual VLAN identifier and determines that the physical VLAN identifier VLAN 200 is already in use and the assignment of this physical identifier would cause a conflict, then this physical VLAN identifier, VLAN 200 is already used by the same VLAN switch devices, 503, 504, as it is requested. Therefore in the next step (not depicted in FIG. 5) the VLAN manager performs the determination procedure, which results in providing the physical VLAN address VLAN 300 for the requested VLAN 100 as a free one. As next, the VLAN manger, 509 assigns the physical VLAN identifier VLAN 300 to the virtual VLAN identifier VLAN 100 for data packets coming from the VM 2.2, 505 and instructs the hosts A and B, 501, 502 to map between the physical VLAN address VLAN 300 and the physical VLAN address VLAN 100 for data packets being transported between the VM 1.1, 508 and the VM 2.2, 505. Thus, a user sees only the originally used VLAN identifiers, VLAN 100, even though different physical identifiers are used in the physical network.

While the current invention has been described in relation to its preferred embodiments, it is to be understood that this description is for illustrative purposes only. The VLAN retagging principle together with the central VLAN management may be included in cloud computing environments. The system allows transparent VLAN management for users of Cloud Computing environments for client applications. However in general the invention may be applied to any management, for example to a data center. It is desired to re-use the same physical VLAN identifier for multiple instances of the same application offered to different customers, providing a solution for avoiding the effort for re-configuring a complete service for example by introducing a longer VLAN identifier address field in the data packets. Accordingly, it is intended that the invention be limited only by the scope of the claims appended hereto.

The invention claimed is:

1. A method for managing an allocation of a VLAN for a deployment between a first virtual machine VM and a second virtual machine VM for transferring data packets, the method comprising the steps of:
receiving a request for allocating a VLAN being identified by a virtual VLAN identifier,
identifying a free physical VLAN identifier
by checking an assignment of a virtual VLAN identifier of the requested VLAN to a physical VLAN identifier wherein the physical VLAN identifier is to be used uniquely by a VLAN switch device for switching data packets of over the requested VLAN and
by performing, in case the physical VLAN identifier is in use, a procedure for determining at least one free physical VLAN identifier wherein the determination procedure comprises estimating for a physical VLAN identifier that each VLAN switch device on the path between the first virtual machine VM and the second virtual machine VM transferring data over the requested VLAN does not already use the same physical VLAN identifier for routing data packets,
assigning the virtual VLAN identifier to the determined at least one free VLAN physical identifier for the requested VLAN, and
instructing the VLAN switch device involved in the communication over the requested VLAN to apply the assignment between the virtual and the physical VLAN identifier to the data packets transferred by the VLAN switch device for the requested VLAN.

2. The method according to claim 1, further comprising administrating the assigning of the virtual and the physical VLAN identifier in a database for storing the usage of the VLANs.

3. The method according to claim 1, wherein the procedure for determining a free physical VLAN comprises:
determining a zone upon receiving a request for allocation of a VLAN between the first virtual machine VM and the second virtual machine VM, whereby at least one switch with attached hosts builds a zone and whereby the deployment of virtual machines VMs is allowed within a zone with a constraint that the VMs are to be deployed to a VLAN on hosts connected to the at least one switch of the zone so that between two zones the particular requested VLAN is blocked by blocking the usage of a particular physical VLAN identifier between the two zones,
identifying a free physical VLAN identifier, wherein the identification appoints the usage of said free physical VLAN identifier within one zone by determining that a VLAN switch device over which the data packets of the requested VLAN are to be transferred does not already use the same physical VLAN identifier for switching data packets, and
assigning the requested virtual VLAN identifier to the identified at least one free physical VLAN identifier and instructing the VLAN switch device to apply a mapping between the virtual and the physical VLAN identifier.

4. The method according to claim 1, wherein the procedure for determining a free physical VLAN comprises:
determining a free physical VLAN identifier for the requested virtual VLAN identifier by ensuring that a VLAN switch device over which the data packets of the requested VLAN are to be transferred does not use the same physical VLAN identifier for switching data packets,
assigning the at least one determined physical VLAN identifier to the requested virtual VLAN identifier and instructing the VLAN switch device to retag incoming and outgoing data packets transported on the requested VLAN according to the assignment between the physical VLAN identifier and the virtual VLAN identifier, wherein the retagging step comprises a configuration of the data packets by replacing a virtual VLAN identifier by a physical VLAN identifier if the data packet comprises the virtual VLAN identifier and by replacing a physical VLAN identifier by a virtual VLAN identifier if the data packet comprises the physical VLAN identifier.

5. The method according to claim 1, wherein the instructing of the VLAN switch device comprises instructing a switch for switching data packets to/from the host being attached to the switch.

6. The method according to claim 1, wherein the instructing of the VLAN switch device comprises instructing a host with a hypervisor for using said instruction while switching data packets between the VMs and a switch to which said host is attached.

7. The method according to claim 6, wherein the method further comprises receiving a report message from the hypervisor regarding the deployment of the VLANs by the VMs.

8. The method according to claim 1, wherein the network is a cloud computing network or a data center.

9. A method for managing an allocation of a VLAN for deployment between a first virtual machine VM and a second virtual machine VM for transferring data packets, the method comprising the steps of:
receiving instruction regarding an assignment of a virtual VLAN identifier of the requested VLAN to at least one free physical VLAN identifier, wherein the physical VLAN identifier is to be used uniquely by a VLAN switch device for switching data packets of the requested VLAN and in case the physical VLAN identifier is in use, a physical VLAN identifier is determined by a determination procedure, wherein the determination procedure comprises estimating for a physical VLAN identifier that each VLAN switch device on the path between the first virtual machine VM and the second virtual machine VM transferring data over the requested VLAN does not already use the same physical VLAN identifier for routing data packets; and
applying the assignment between the virtual VLAN identifier of the requested VLAN to the physical VLAN identifier to the data packets being transported by the VLAN switch device for the requested VLAN.

10. The method according to claim 9, wherein the applying the assignment to the incoming and outgoing data packets comprises retagging the data packets.

11. The method according to claim 9, wherein a unique VM identifier of the VMs deployed to the VLAN is added to the instruction regarding the assignment between the virtual VLAN identifier of the requested VLAN to the free physical VLAN identifier.

12. The method according to claim 9, wherein the method further comprises sending a request towards a VLAN manager for allocating a VLAN for the deployment of at least one VM.

13. A VLAN manager device adapted to manage an allocation of a VLAN for deployment between a first virtual machine VM and a second virtual machine VM for transferring data packets, the device comprising:
a receiver adapted to receive a request for allocating a VLAN, wherein the VLAN is identified by a virtual VLAN identifier,
a determination unit adapted to identify a free VLAN by checking an assignment of a virtual VLAN identifier of the requested VLAN to a physical VLAN identifier wherein the physical VLAN identifier is to be used uniquely by a VLAN switch device for switching data packets of the requested VLAN and, in case the physical VLAN identifier is in use, is adapted to perform a procedure for determining at least one free physical VLAN identifier, wherein the determination procedure is adapted to estimate for a physical VLAN identifier that each VLAN switch device on the path between the first virtual machine VM and the second virtual machine VM transferring data over the requested VLAN does not already use the same physical VLAN identifier for routing data packets,
an assignment unit adapted to assign the requested virtual VLAN identifier to the at least one free physical VLAN identifier for the VLAN, and
a sender adapted to instruct each VLAN switch device involved in the communication over the requested VLAN to apply the assignment between the virtual and the physical VLAN identifier to the data packets transferred by the VLAN switch device for the requested VLAN.

14. A VLAN switch device adapted to allocate a VLAN for a deployment between a first virtual machine VM and a second virtual machine VM for transferring data packets, the device comprising:
a receiver adapted to receive an instruction regarding an assignment of a virtual VLAN identifier of the requested VLAN to a free physical VLAN identifier, wherein the physical VLAN identifier is to be used uniquely by a VLAN switch device for switching data packets of the requested VLAN and, in case the physical VLAN identifier is in use, a physical VLAN identifier is determined by a determination procedure, wherein the determination procedure is adapted to estimate for a physical VLAN identifier that each VLAN switch device on the path between the first virtual machine VM and the second virtual machine VM transferring data over the requested VLAN does not already use the same physical VLAN identifier for routing data packets, and
an implementation unit adapted to apply the assignment between the virtual and the physical VLAN identifier to the data packets being transported over the requested VLAN.

15. A method for managing an allocation of a VLAN for deployment between a first virtual machine VM and a second virtual machine VM for transferring data packets, the method comprising the steps of:
transporting a request for allocating a VLAN for the deployment between the first and the second VM to a VLAN manager device, wherein the VLAN is identified by a virtual VLAN identifier,
identifying a free physical VLAN identifier by checking an assignment of a virtual VLAN identifier of the requested VLAN to a physical VLAN identifier wherein the physical VLAN identifier is to be used uniquely by a VLAN switch device for switching data packets of the requested VLAN and, in case the physical VLAN identifier is in use, a procedure for determining at least one free physical VLAN identifier is performed, wherein the determination procedure comprises estimating for a physical VLAN identifier that each VLAN switch device on the path between the first virtual machine VM and the second virtual machine VM transferring data over the requested VLAN does not already use the same physical VLAN identifier for routing data packets,
assigning the virtual VLAN identifier to the determined at least one free physical VLAN identifier for the requested VLAN,
instructing each VLAN switch device involved in the communication over the re-quested VLAN to apply the assignment between the virtual and the physical VLAN identifier to the data packets transferred by the VLAN switch device for the requested VLAN, and
applying the assignment between the virtual VLAN identifier of the requested VLAN to the physical VLAN identifier to the data packets being transported over the VLAN in the VLAN switch device.

\* \* \* \* \*